US009042361B2

(12) United States Patent
Makhlouf et al.

(10) Patent No.: US 9,042,361 B2
(45) Date of Patent: May 26, 2015

(54) METHOD AND APPARATUS FOR MITIGATING INTERFERENCE BETWEEN DEVICES OF DIFFERENT WIRELESS WIDE AREA NETWORKS

(71) Applicant: MOTOROLA SOLUTIONS, INC., Schaumburg, IL (US)

(72) Inventors: Isam R. Makhlouf, Lake Zurich, IL (US); Mark Shahaf, Vernon Hills, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 294 days.

(21) Appl. No.: 13/654,792

(22) Filed: Oct. 18, 2012

(65) Prior Publication Data
US 2014/0112320 A1    Apr. 24, 2014

(51) Int. Cl.
*H04W 72/02* (2009.01)
*H04L 1/00* (2006.01)
*H04W 24/02* (2009.01)
*H04W 72/08* (2009.01)
*H04W 88/06* (2009.01)
*H04W 48/16* (2009.01)
*H04W 84/04* (2009.01)
*H04W 84/12* (2009.01)

(52) U.S. Cl.
CPC .............. *H04W 72/02* (2013.01); *H04W 24/02* (2013.01); *H04W 72/082* (2013.01); *H04W 88/06* (2013.01); *H04L 1/00* (2013.01); *H04W 48/16* (2013.01); *H04W 84/04* (2013.01); *H04W 84/12* (2013.01)

(58) Field of Classification Search
USPC ............... 370/337–338, 311; 455/41.2, 63.1, 455/426.1, 444; 702/60
See application file for complete search history.

(56) References Cited

U.S. PATENT DOCUMENTS

| | | | |
|---|---|---|---|
| 6,844,821 B2 | 1/2005 | Swartzel et al. | |
| 7,152,040 B1 | 12/2006 | Hawthorne et al. | |
| 7,472,027 B1 * | 12/2008 | Batcher et al. | 702/60 |
| 7,775,430 B2 | 8/2010 | Lin | |
| 7,782,194 B2 | 8/2010 | Stawar et al. | |
| 7,990,933 B2 * | 8/2011 | Horvat et al. | 370/337 |
| 8,126,198 B2 | 2/2012 | Batt | |
| 8,134,931 B2 | 3/2012 | Larola et al. | |
| 8,222,999 B2 | 7/2012 | Hiramatsu et al. | |
| 2006/0114864 A1 | 6/2006 | Fuccello et al. | |
| 2006/0292986 A1 | 12/2006 | Bitran et al. | |
| 2007/0092046 A1 | 4/2007 | Lee | |
| 2007/0281617 A1 * | 12/2007 | Meylan et al. | 455/41.2 |
| 2009/0318087 A1 * | 12/2009 | Mattila et al. | 455/63.1 |
| 2010/0056136 A1 | 3/2010 | Zhu | |
| 2010/0060452 A1 | 3/2010 | Schuster et al. | |
| 2011/0237246 A1 * | 9/2011 | Sen | 455/426.1 |
| 2012/0021689 A1 | 1/2012 | Han | |
| 2012/0044915 A1 * | 2/2012 | Oerton | 370/338 |

(Continued)

OTHER PUBLICATIONS

Wi-Fi™ and Bluetooth™—Interference Issues; Jan. 2002; Reference on the web: "1 IEEE 8022.15.2 definition of coexistence".

*Primary Examiner* — Vincelas Louis
(74) *Attorney, Agent, or Firm* — Daniel R. Bestor

(57) ABSTRACT

A portable communication device operating of a first WWAN can receive an identifier from a WLAN access point indicating that one or more devices operating on a second WWAN are in the vicinity of the WLAN access point. In response, the portable communication device invokes an interference mitigation process while the identifier indicates that devices operating on the second WWAN are present.

20 Claims, 4 Drawing Sheets

(56) References Cited

U.S. PATENT DOCUMENTS

| | | |
|---|---|---|
| 2012/0134280 A1 | 5/2012 | Rotvold et al. |
| 2012/0148068 A1 | 6/2012 | Chandra et al. |
| 2013/0090119 A1* | 4/2013 | Sharony et al. ............... 455/444 |
| 2013/0155931 A1* | 6/2013 | Prajapati et al. .............. 370/311 |
| 2013/0170439 A1 | 7/2013 | Anderson et al. |
| 2013/0272436 A1 | 10/2013 | Makhlouf et al. |

* cited by examiner ion compatibility, and more particularly to mitigating interference between transceivers of different air interfaces operating on nearby, but non-overlapping frequency bands.

METHOD AND APPARATUS FOR MITIGATING INTERFERENCE BETWEEN DEVICES OF DIFFERENT WIRELESS WIDE AREA NETWORKS

FIELD OF THE DISCLOSURE

The present disclosure relates generally to radio co-location compatibility, and more particularly to mitigating interference between transceivers of different air interfaces operating on nearby, but non-overlapping frequency bands.

BACKGROUND

There are a wide variety of radio communication technologies presently in use, many of which are employed by portable and mobile communications systems. A given mobile radio communication technology may be specified as an air interface that describes and defines the aspects of radio operation that allow devices to communicate, such as frequencies of operation, modulation type, timing, and other radio communication parameters. Many such technologies are regulated by government agencies in part to assure that systems do not unduly interfere with each other, and to assure that there are sufficient resources (e.g. radio spectrum) available for use without interference.

In some cases, however, despite complying with regulations, there can still be undesirable effects between devices operating on different communications systems and which are operating on nearby frequencies. When devices operating on different communications systems and on nearby frequency bands are in close proximity to each other, out of band emissions (OOBE) from transmissions by one device can degrade reception by a device operating on a different, but nearby frequency band.

This co-location problem has been addressed in the past by, for example, designing devices that are able to directly detect the presence of other devices operating on nearby frequencies, such as by using personal area network technologies (e.g. Bluetooth), or by directly detecting transmissions of other devices. However, previous solutions do not adequately address the situation where communications devices cannot detect each other directly.

Accordingly, there is a need for an improved method and apparatus for resolving the problem of co-location compatibility among radio communication devices that do not directly communicate with each other.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
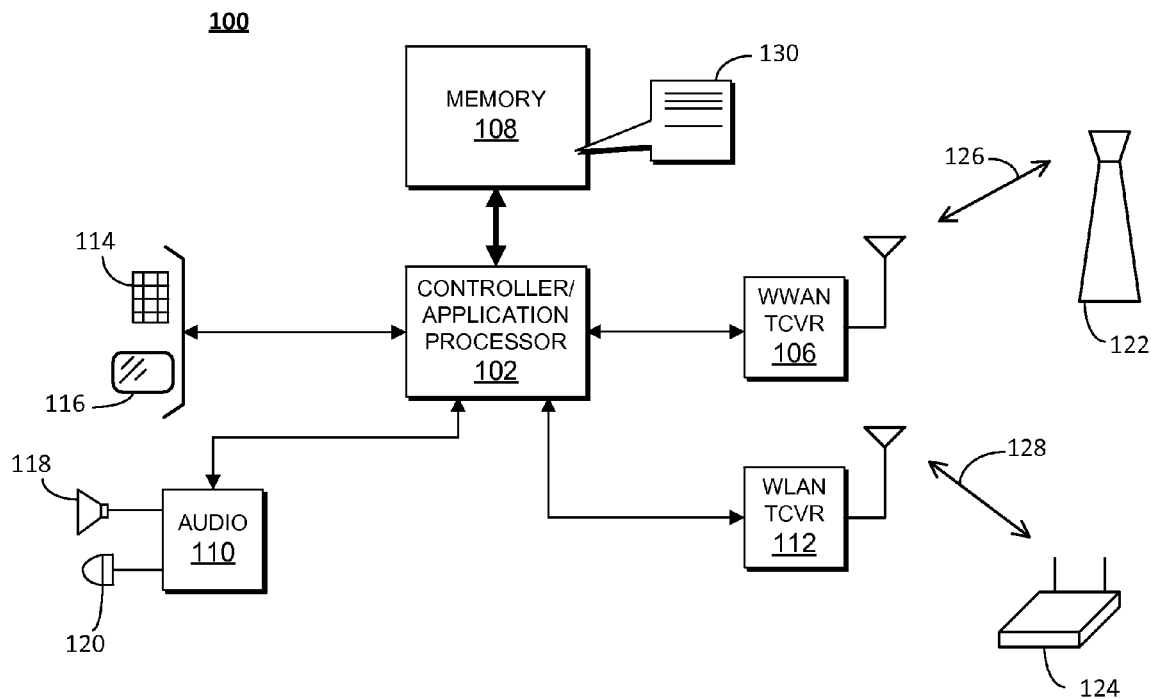
FIG. 1 is a block diagram of a communication apparatus in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments described herein include methods, apparatuses, and systems that address the failings of the prior art to address issues of co-location compatibility among radio devices operating on different networks and on adjacent or nearby frequency bands. Some embodiments include a method that comprises receiving an identifier of a wireless local area network (WLAN) access point in a signal broadcast by the WLAN access point. The identifier can be received by, or via, a WLAN transceiver of a portable communication device. The method embodiments can further include determining, by the portable communication device, based at least in part on the identifier, that an interference mitigation measure is to be taken in operating a wireless wide area network (WWAN) transceiver of the portable communication device. In response to determining that the interference mitigation measure is to be taken, method embodiments can further include configuring the WWAN transceiver to avoid using at least one frequency band of a WWAN air interface while accessing the WWAN over the WWAN air interface.

FIG. 1 is a block diagram of a communication apparatus 100 in accordance with some embodiments. In some embodiments the communication apparatus 100 can be a portable communication device that is battery powered and can be carried by a person for communicating using voice communication, data communication, or both. In general, the communication apparatus 100 is capable of wirelessly communicating, via radio signals, with both a wireless wide area network (WWAN) and a wireless local area network (WLAN).

A controller 102 provides control and operation of the communication apparatus 100. The controller 102 is coupled to a memory 108, which can represent an aggregate of read only memory (ROM), random access memory (RAM), flash memory, and so on. Generally, the memory 108 contains, in part, instruction code that is executable by the controller 102 for implementing various functions, features, and operations of the communication apparatus 100, as designed by the manufacturer of the communication apparatus 100. The controller 102 interfaces with a WWAN transceiver 106, a WLAN transceiver 112, and an audio processor 110. The audio processor 110 can be operably coupled to a speaker 118 and a microphone 120. The audio processor 110 receives digital audio signals and converts them to analog signals that are played over the speaker 118, which can be, for example, an earpiece speaker, a loudspeaker, or any other speaker. The communication apparatus 100 can include multiple speakers, such as speaker 118, for different purposes or for different volume levels. The microphone 120 converts acoustic signals incident on the microphone into analog audio signals that the audio processor 110 can amplify, filter, and digitize to produce digital audio signals to be transmitted. The communication apparatus 100 can further include user interface elements, such as, for example, a keypad 114 and other buttons, knobs, and the like, and a graphical display 116 for displaying information.

The WWAN transceiver 106 is a radio transceiver that is operable to communicate with a WWAN base station 122, which can be, for example, a cellular radio system base station, a trunked radio base station or repeater, or any other wide area radio access technology. A WWAN base station 122 can communicate with the communication apparatus 100 via the WWAN transceiver 106 at distances on the order of miles, or tens of miles. The WWAN base station 122 provides a WWAN air interface 126 in a geographic region around the WWAN base station 122, and the WWAN air interface 126 specifies an access protocol such as a frequency plan, modulation, timing, control information, access contention, and so on, as is known. Both voice and data communication can be supported by the WWAN air interface 126 and communicated over the WWAN air interface 126. The WWAN transceiver 106 includes components and circuitry for radio operation, including, for example, circuitry for frequency synthesis, filtering, modulation/demodulation, and amplification.

Similarly, the WLAN transceiver 112 is operable to communicate with a WLAN access point 124 over a WLAN air interface 128. A WLAN allows wireless communication at distances of tens of feet, potentially up to hundreds of feet in mostly clear line of sight conditions, but at communication distances significantly less than WWAN communications. The access point 124 is typically connected to a data network and facilitates communication between remote devices like the communication apparatus 100 and the network to which the access point 124 is connected. For example, the access point 124 can be connected to the Internet, or an internet gateway, to facilitate network connectivity for devices such as the communication apparatus 100. In some embodiments the WLAN can be operated according the specifications such as those published by the Institute of Electrical and Electronic Engineers (IEEE) under standard 802.11. In order to access the network to which the access point 124 is connected, a remote device such as communication apparatus 100 must "associate" with the WLAN access point 124. The association process is well known in the art, and once a device associates with the WLAN access point, the WLAN access point acts as a wireless router for that device. Likewise, when a device de-associates from a WLAN access point, the WLAN access point ceases providing network connectivity to the de-associated device. As used herein, the term "WLAN enabled" refers to the ability to communicate and associate with a WLAN access point.

The communication apparatus 100 further includes an interference mitigation functionality 130. The interference mitigation functionality 130 prevents the WWAN transceiver 106 from using one or more frequency bands of the corresponding WWAN air interface 126 so as to avoid interfering with nearby communication devices operating on a different WWAN. Since the WLAN access point 124 can connect to communication devices operating on a WWAN other than the WWAN to which WWAN base station 122 belongs, devices operating on two or more WWANs can be in close proximity to each other around the WLAN access point 124, which can result in interference from out of band emissions between devices operating on different WWANs. The WLAN access point 124 can transmit information to the communication apparatus 100 indicating that the interference mitigation functionality 130 should be invoked by the communication apparatus 100 to prevent the undesired effects of out of band emissions in close proximity. The interference mitigation functionality 130 can be, in some embodiments, implemented in software instruction code that is executed by the controller 102 in accordance with the teachings herein. The interference mitigation functionality 130 can include functionality to determine when to invoke one or more interference mitigation measures. In some embodiments, whenever a WLAN identifier is received via the WLAN transceiver 112 from a WLAN access point 124, the WLAN identifier is evaluated by the interference mitigation functionality 130 to determine if the WLAN identifier indicates that an interference mitigation measure is to be taken. In some embodiments it is not necessary for the communication apparatus 100 to associate with the WLAN access point 124 as the communication apparatus 100 can, in some embodiments, receive the identifier without associating with the WLAN access point 124.

Figure 2:
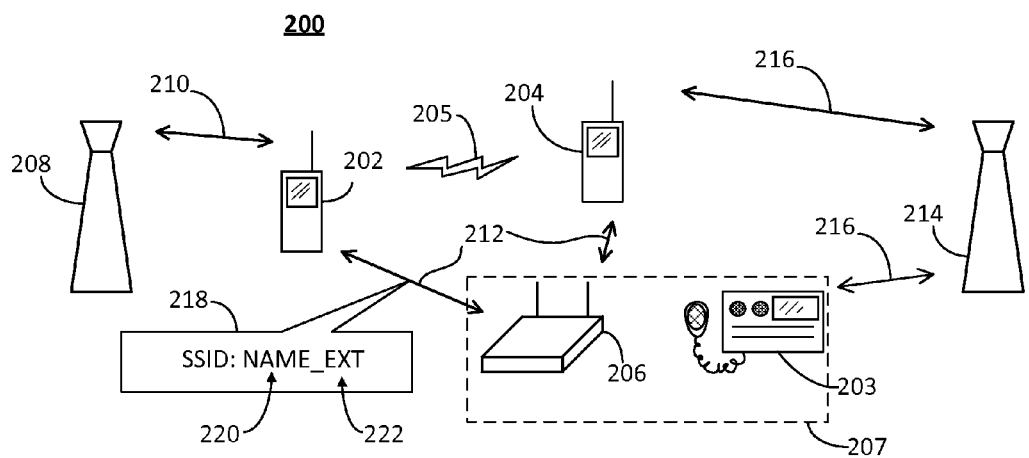
FIG. 2 is a system diagram of communication devices operating on different wireless wide area networks and a common wireless local area network in accordance with some embodiments.

FIG. 2 is a system diagram 200 showing communication devices that operate on different WWANs, and that are in the vicinity of a WLAN access point 206 in accordance with some embodiments. A first portable communication device 202 can be substantially similar to the communication apparatus 100 represented in FIG. 1, including interference mitigation functionality 130. The first portable communication device 202 includes a WWAN transceiver and can connect to a first WWAN base station 208 of a first WWAN over a first WWAN air interface 210. The first WWAN air interface 210 can include a data communication interface such as, for example, that specified by the Long Term Evolution (LTE) standard developed by the $3^{rd}$ Generation Partnership Project (3GPP). A mobile communication device 203 and a second portable communication device 204 connect to a second WWAN base station 214, which is part of a second WWAN, over a second WWAN air interface 216. The second WWAN is a different network than the first WWAN, and the first and second air interfaces, 210, 216 can be different air interfaces. The second WWAN can be a public safety narrowband (PSNB) radio network, such as a trunked radio network. The mobile communication device 203 and second portable communication device 204 each comprise the necessary radio and control circuitry and components to access the second WWAN over the second air interface 216.

Both the first and second portable communication devices 202, 204 and the mobile communication device 203 are located in the vicinity of a WLAN access point 206. Mobile communication device 203 can be co-located with the access point 206 in a fixed manner as indicated by dashed box 207. For example, in some embodiments the WLAN access point 206 can be included in a vehicular subscriber modem (VSM) that is mounted in a vehicle and provides wireless or wired access to Internet and other network services, and the mobile communication device 203 can be mounted in the same vehicle as the access point 206, making them permanently co-located. The WLAN access point 206 provides a wireless access interface 212 to portable communications unit 202, and possibly also to portable communication unit 204 if it is WLAN enabled. The mobile communication device 203 can have no WLAN functionality. While connected to the WLAN access point 206 the first portable communication device 202 can access data and other network services via the WLAN access point 206 while continuing to use the first WWAN for voice communication. In some embodiments first portable communication device 202 can continue using the first WWAN for data communication instead of, or in addition to using the WLAN access point 206 for such communication. One feature of the WLAN interface 212 includes the transmission, such as in a broadcast channel, of an identifier 218. In some embodiments the identifier 218 can be a service set identifier (SSID) of the WLAN access point 206. In some embodiments the identifier 218 can be a media access control (MAC) address of the WLAN access point 206. Other possibilities exist as well.

Devices operating on the first WWAN, such as first portable communication device 202, can determine, based at least in part on the identifier 218, that an interference mitigation measure is to be taken so as to avoid undesirable effects 205 on, for example, mobile communication device 203 and second portable communication device 204. Likewise, operation of the mobile communication device 203 and second portable communication device 204 on certain frequency bands of second air interface 216 can affect operation on frequency bands of first air interface 210 as used by the first portable communication device 202 when first portable communication device 202 is in sufficient proximity to either portable communication device 204 or mobile communication device 203. Accordingly, the interference mitigation measure taken by first portable communication device 202 can be to avoid operation on one or more frequency bands of first air interface 210 that are nearby (in the frequency spectrum) to frequency bands used by second air interface 216.

The identifier 218 can indicate to the first portable communication device 202 that communication devices operating on the second WWAN air interface 216 are in the vicinity of the WLAN access point 206. For example, in some embodiments, the first portable communication device 202 can include a list of identifiers of WLAN access points that are known to be used by, or co-located with (e.g. in the same vehicle) communication devices that use the second WWAN air interface 216. Upon receiving the identifier 218, the first portable communication device 202 can cross reference the identifier 218 with a stored list or table to determine if the identifier 218 indicates devices operating on the second WWAN air interface 216 are operating near the WLAN access point 206 (e.g. associated with the access point 206 or known to be co-located with the access point 206). If the identifier 218 is on the list, then the first portable communication device 202 can invoke the interference mitigation measure 130.

In some embodiments, the identifier 218 can be a changeable identifier 218 that indicates whether to invoke the interference mitigation measure. For example, in some embodiments, the identifier 218 can be have both a name field 220 and an extension field 222. The name 220 can be, for example, "NYPD0123" and the extension 222 can be "MIT," which is used to indicate that devices using the second WWAN air interface 216 are present in the vicinity of the WLAN access point 206. Thus, the SSID 218 received by WLAN-enabled devices in the vicinity of WLAN access point 206 would be, for example, "NYPD0123_MIT". Furthermore, the extension can be dynamic, such that the identifier 218 can be changed dynamically as devices operating on the second WWAN air interface 216 associate with, or de-associate from, the WLAN access point 206. In some embodiments including a fixed and co-located communication device, such as when the WLAN access point 206 and mobile communication device 203 are mounted in the same vehicle, there can be a connection (wired or wireless) between the WLAN access point 206 and mobile communication device 203 that allows the WLAN access point 206 to determine if the mobile communication device 203 is turned on, or otherwise in active operation. When the mobile communication device 203 is operating, the extension 222 can be present. When the mobile communication device 203 is inactive (e.g. off or asleep), the extension 222 can be absent or otherwise configured to indicate interference mitigation is not needed at the first portable communication device 202.

In embodiments where at least some devices operating on the second WWAN air interface 216 are WLAN-enabled and able to associate with the WLAN access point 206, and no devices operating on the second WWAN air interface 216 are presently associated with the WLAN access point 206, devices operating on the first WWAN air interface 210 may not need to undertake the interference mitigation measure, thus the extension can be absent from the identifier 218 (e.g. "NYPD0123" with no extension 222), or configured to indicate that no interference mitigation is necessary (e.g. "NYDP0123_NON"). When a WLAN-enabled device operating on the second WWAN air interface 216 then associates with the WLAN access point 206, the WLAN access point 206 can change the identifier 218, such as by changing the extension 222, to indicate the presence of a device operating on the second WWAN air interface 216 so that devices operating on the first WWAN air interface 210, upon receiving the identifier 218, can invoke appropriate interference mitigation measures. In some embodiments the extension 222 can be preceded by a predefined character sequence that can be recognized when the identifier 218 is parsed by a device receiving the identifier 218. In some embodiments the extension 222 can be present in the identifier 218 only when a device operating on the second WWAN air interface 216 is associated with the WLAN access point 206, or vice-versa.

Furthermore, the portable communication devices 202, 204 can be designed so that dynamic changes to the identifier 218 do not cause the WLAN transceiver in the portable communication device(s) to disconnect from, or re-associate with the WLAN access point 206. That is, in the prior art, changing the SSID of a WLAN access point causes WLAN devices associated with the WLAN access point to drop their connection (dissociate) and possibly re-associate with the WLAN access point, which can take a significant period of time and cause loss of data in data communication activity. Conversely, in accordance with some embodiments, first portable communication device 202 and second portable communication device 204, when WLAN enabled, maintain association with WLAN access point 206 when the extension 222 is changed by the WLAN access point 206.

It is contemplated that the identifier 218 can be used in various ways to indicate how devices operating on the first WWAN air interface 210 are to determine when to invoke interference mitigation measures. As mentioned, the identifier 218 itself can indicate that the interference mitigation measure is to be invoked, such as if the identifier 218 is on a list of identifiers requiring such action. In embodiments where the mobile communication device 203 is co-located and fixed with the WLAN access point 206, for example, the identifier 218 can be on a list of identifiers of WLAN access points known to be co-located with mobile communication devices, or otherwise configured to indicate such. In such embodiments devices operating on the first WWAN air interface 210 can further measure the signal strength of the WLAN access point 206 transmissions to infer distance to the WLAN access point 206 so that the interference mitigation measure is invoked only when the device (e.g. 202) is close enough to the WLAN access point 206, as indicated by the signal strength of the WLAN access point 206 transmissions, to result in undesired effects between the device operating on the first WWAN air interface 210 and a device operating on the second WWAN air interface 216.

Furthermore, in some embodiments, where a portable device 204 operating on the second WWAN air interface 216 is able to indicate its presence to the WLAN access point 206 via a short range communication protocol, e.g. Bluetooth (e.g. IEEE standard 802.15), the WLAN access point 206 can infer that the portable device 204 is in close proximity and can modify identifier 218 with an extension 222. Then devices operating on the first WWAN air interface 210 can determine whether to invoke interference mitigation measures depending on the signal strength from WLAN access point 206.

In some embodiments both approaches can be used together. For example, the identifier 218 can be one known to be associated with a fixed and co-located mobile communication device 203, allowing devices operating on the first WWAN to use the signal strength method to determine proximity to the WLAN access point 206 and invoke the interference mitigation measure when the signal strength indicates the device is within a threshold distance from the WLAN access point 206. However, if and when a device operating on the second WWAN air interface 216 is determined to be in close proximity with the WLAN access point 206, the identifier 218 can be changed to make such indication to devices operating on the first WWAN air interface 210. In some embodiments the extension can be used to indicate that the mobile communication device 203 and portable communication device 204 are active, or not active, so that when the mobile communication device 203 and portable communication device 204 are not active, devices operating on the first WWAN air interface 210 may not need to invoke the interference mitigation measure.

Figure 3:
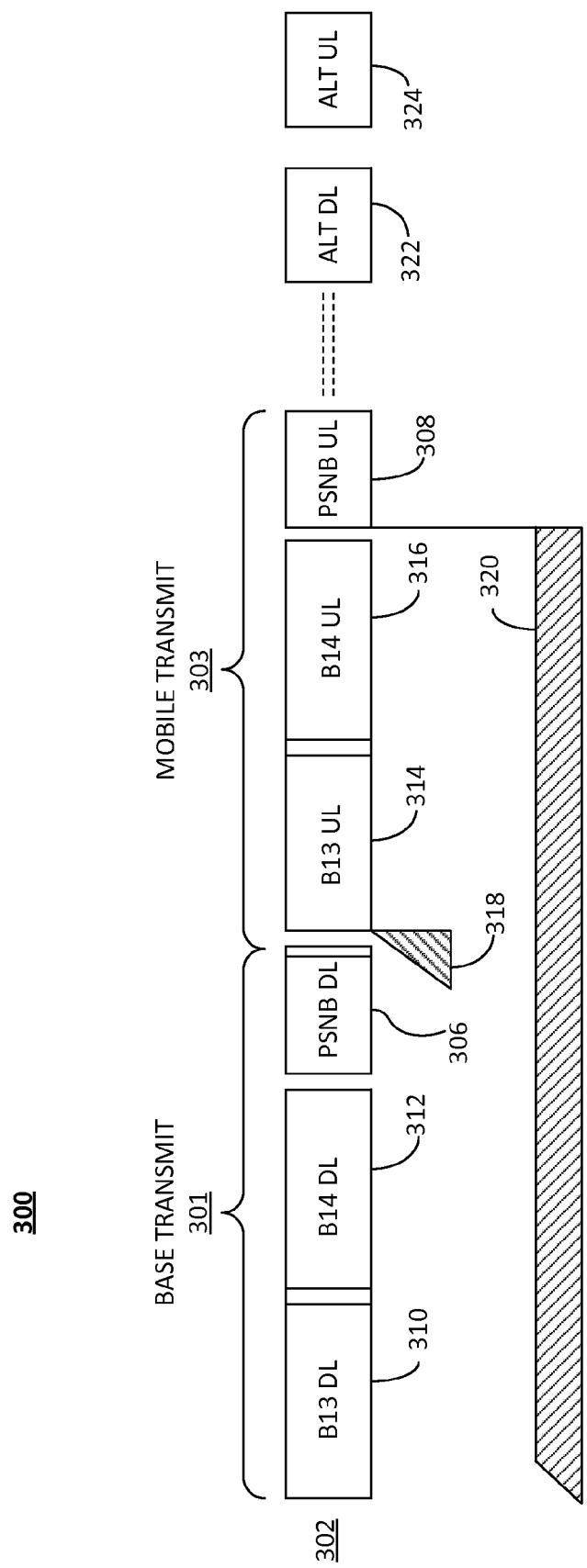
FIG. 3 is a frequency band map comparing two wireless wide area network systems in accordance with some embodiments.

FIG. 3 is a frequency band plan 300 showing bands of two WWAN air interfaces in accordance with some embodiments. The frequency map 302 shown here is exemplary only, using frequency bands defined for particular uses in the United States by the Federal Communications Commission. Those skilled in the art will appreciate that the teachings of the present example can be applied to other frequencies and other WWANs, and in accordance with other countries' laws and relegations.

The map 302 shows a frequency band map of a first WWAN air interface that can include downlink (DL) bands 310, 312, and uplink (UL) bands 314, 316. As used here "uplink" refers to wireless radio transmission from a portable/mobile device to a base station, and "downlink" refers to wireless radio transmission from a base station to portable/mobile devices. The first WWAN interface, including downlink bands 310, 312 and uplink bands 314, 316 can be an LTE air interface. The map 302 further shows frequency bands for a second WWAN air interface that can be, for example, a PSNB radio map having DL band 306 and UL band 308. In exemplary map 302, frequency increases from left to right, and starts at about 746 MHz at the far left of the band 310, and increases to about 806 MHz at the far right of band 308. The map 302 is split into an UL section 303, which are frequencies at which mobile/portable devices transmit and base stations of the corresponding WWAN receive, and a downlink (DL) section 301, in which base stations transmit and mobile/portable devices receive.

The map 302 includes a band pair 306, 308 for PSNB radio operation. Band 306 is a receive band (downlink) in which mobile/portable PSNB devices receive signals transmitted by a base station at 769 MHz to 775 MHz. The PSNB uplink band 308 is located at 799 MHz to 805 MHz. Map 302 further includes LTE band pairs; band B13 downlink 310 at 746 MHz-756 MHz paired with uplink band 314 at 777 MHz to 787 MHz, and downlink band B14 312 at 758 MHz to 768 MHz paired with uplink band 316 at 788 MHz to 798 MHz. By "paired" it is meant that device use the paired uplink and downlink band for transmission/reception, respectively. Guard bands of 1 MHz can be defined between the bands.

When LTE devices using bands 310/314 and/or 312/316 and PSNB devices using bands 306/308 are in sufficiently close physical proximity they can negatively affect each other in receiving from their respective base stations. While complying with applicable regulations for in-band and out of band signal levels, the out of band emission, represented by shape 318, can affect PSNB reception in downlink band 306. LTE devices transmit typically at levels of about 200 milliwatts or less, but as the PSNB downlink band 306 is adjacent LTE uplink band 314, sufficiently close physical proximity between an LTE device transmitting on band 314 can result in the out of band emissions 318 being substantial enough to interfere with PSNB reception in downlink band 306.

Similarly, PSNB transmissions in uplink band 308 can have out of band emissions, represented by shape 320, that can affect reception in LTE downlink bands 310, 312. Even though downlink bands 310, 312 are separated in frequency from uplink band 308 by 32 MHz or more, the transmit level of portable (hand held) PSNB devices can be on the order of 3 watts for portable devices, and on the order of 30 watts for mobile (vehicular mounted device) PSNB transmissions. Thus, the PSNB out of band emissions from transmissions in uplink band 308 can still affect reception in LTE downlink bands 310, 312 given sufficient physical proximity to an LTE device.

Accordingly, in some embodiments, when a WLAN enabled PSNB portable device associates with a WLAN access point configured and designed in accordance with the teachings herein, or in some embodiments where the WLAN access point is co-located with a mobile PSNB device, WLAN enabled LTE devices, upon receiving an appropriate identifier from the WLAN access point, can invoke an interference mitigation measure where the WLAN-enabled LTE device avoids using one or more frequency bands (DL and UL band pairs) of the LTE air interface. For example, the WLAN-enabled LTE devices can use alternate DL and UL bands 322, 324, respectively, that can be defined above 850 MHz, for example. In some embodiments, the WLAN-enabled LTE devices can simply cease using the LTE air interface and use the WLAN for data communication. The switch from using the LTE WWAN to using the WLAN can be based at least in part, for example, on WLAN traffic. That is, if the WLAN has a significant amount of traffic (which may also be indicated by the extension 222), the LTE device can continue accessing data service over the LTE WWAN. If the WLAN has sufficiently low traffic, the LTE device can switch to the WLAN for data service access.

Figure 4:
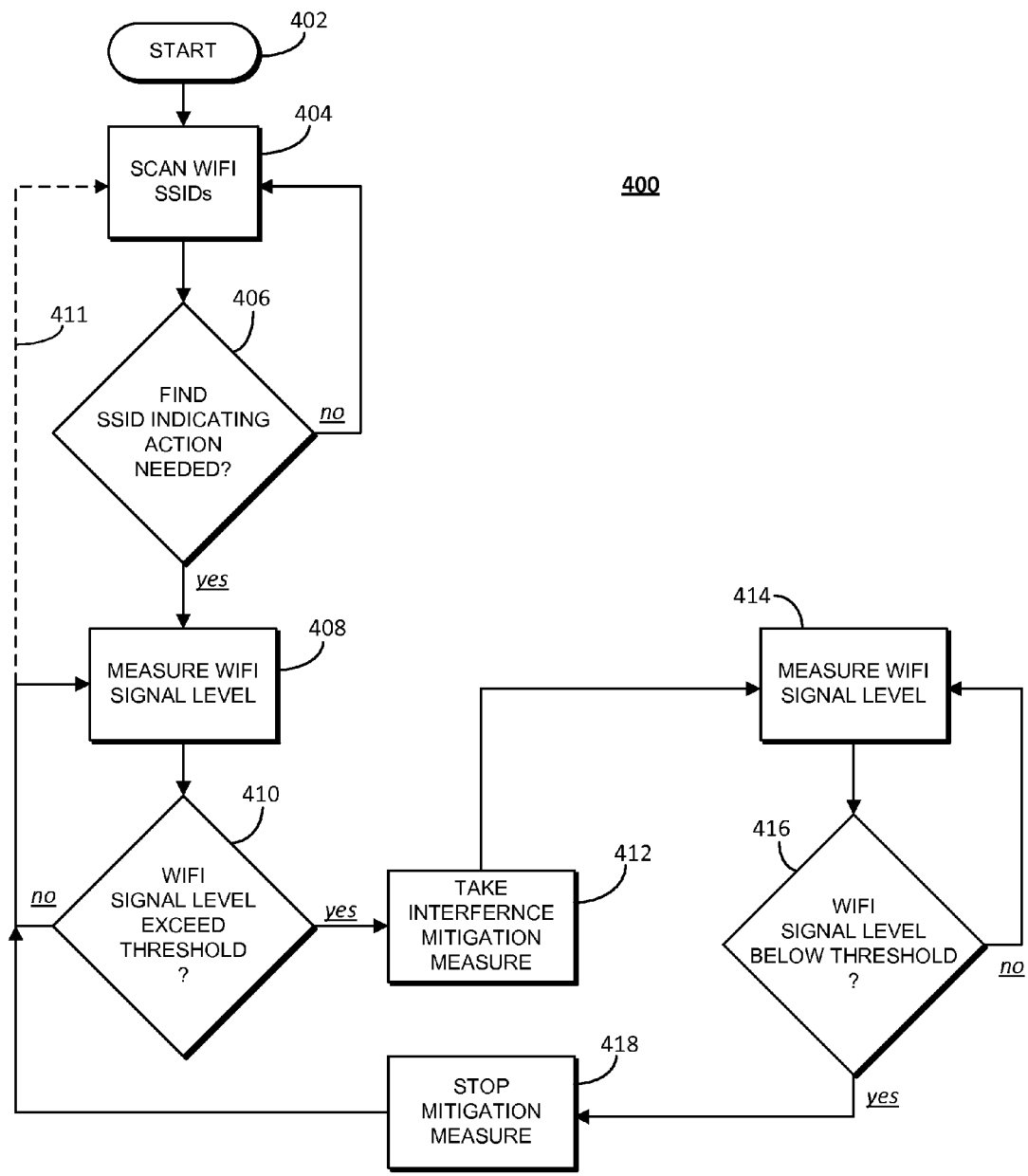
FIG. 4 is a flowchart diagram of a method of using an interference mitigation measure in accordance with some embodiments.

FIG. 4 is a flowchart diagram of a method 400 of using an interference mitigation measure in accordance with some embodiments. The method 400 can be implemented in some embodiments by a public safety LTE integrated portable or mobile radio device that can support two-way voice operation (e.g. half duplex push to talk communication) and data communication, and which is also WLAN-enabled. Such devices can roam to public carrier LTE systems when out of the service area of a public safety LTE base station. The method 400 is described as various processes abstracted here into boxes of the flow chart diagram.

At the start 402 of the method 400, the portable device implementing the method 400 is powered up and ready to engage in communication activity, including being registered and wirelessly connected to a WWAN for communication service. The device performing the method 400 scans for WLAN access point identifiers, such as SSIDs, in process 404 using a WLAN transceiver integrated into the device. In process 406 the method 400 evaluates any SSIDs found while scanning 404 in part to determine if an interference mitigation measure needs to be invoked. For example, a detected SSID can be on a list of SSIDs stored in the device, or on a list accessible by the device (e.g. on a networked server accessible via the WWAN), or the SSID can contain an appropriate extension or other information indicative of a need to invoke the interference mitigation measure. An interference mitigation measure may need to be invoked, for example, when the WLAN access point is known to be co-located with a mobile communication device with which the portable LTE device implementing this method may interfere. If an SSID indicating the interference mitigation measure may be necessary (e.g. "yes" from process 406), the method 400 can then, in some embodiments, measure the signal strength of the radio signal transmitting the SSID, as in process 408. The signal strength can be indicated, for example, by a received signal strength indicator (RSSI) level. The signal strength can be compared to a preselected threshold level, as in process 410. While the signal strength is below the threshold (e.g. "no" out of process 410) the device continues to measure the signal strength (408) and compare it to the threshold (410), while the signal is still strong enough to be received. The signal containing the detected SSID can be from a WLAN access point to which the device is associated, and in some embodiments the SSID can be from a WLAN access point with which the device is not associated, but is in range. In some embodiments the device implementing method 400 can be associated with a first WLAN access point and detect the SSID indicating the interference mitigation measure is necessary from a different WLAN access point with which the device is not associated. In process 410, the signal strength can fall low enough that the WLAN access point is considered out of range and the method can return to scanning for SSIDs, as indicated by the dashed line 411.

In embodiments conditioned upon WLAN signal strength, if the signal strength exceeds the threshold (e.g. "yes" out of process 410), the interference mitigation measure can be invoked in process 412. The interference mitigation measure can be invoked by the device implementing method 400, resulting in the device avoiding operating its WWAN transceiver on one or more frequency bands of the WWAN air interface. While the interference mitigation measure is invoked, the method continues to measure the signal containing the detected SSID in processes 414 and 416. While the signal strength remains above the threshold, or a lower hysteresis threshold for a hysteresis effect (e.g. "no" out of process 416), the interference mitigation measure remains in force. If the received signal strength drops below the threshold or hysteresis threshold (e.g. "yes" out of process 416), then the method 400 commences by ceasing the interference mitigation measure, as indicated by process 418, where the method returns to measuring the signal strength at process 408. Processes 408-418 are only valid while WLAN signal on which the SSID was detected is still being received. If the signal drops below, for example, a minimum threshold level, which is significantly below the threshold used in processes 410, 416, the method can reset back to process 404 as indicated by dashed line 411. In some embodiments even while the method is monitoring one WLAN access point via processes 408-416, the device can still continue scanning for other WLAN SSIDs and apply the same processes in parallel to any other detected WLAN access points. It will be appreciated that the method 400 does not require association with the WLAN access point (e.g. connecting to the WLAN access point via the WLAN access point's air interface), only reception of identifier transmitted by the WLAN access point.

Figure 5:
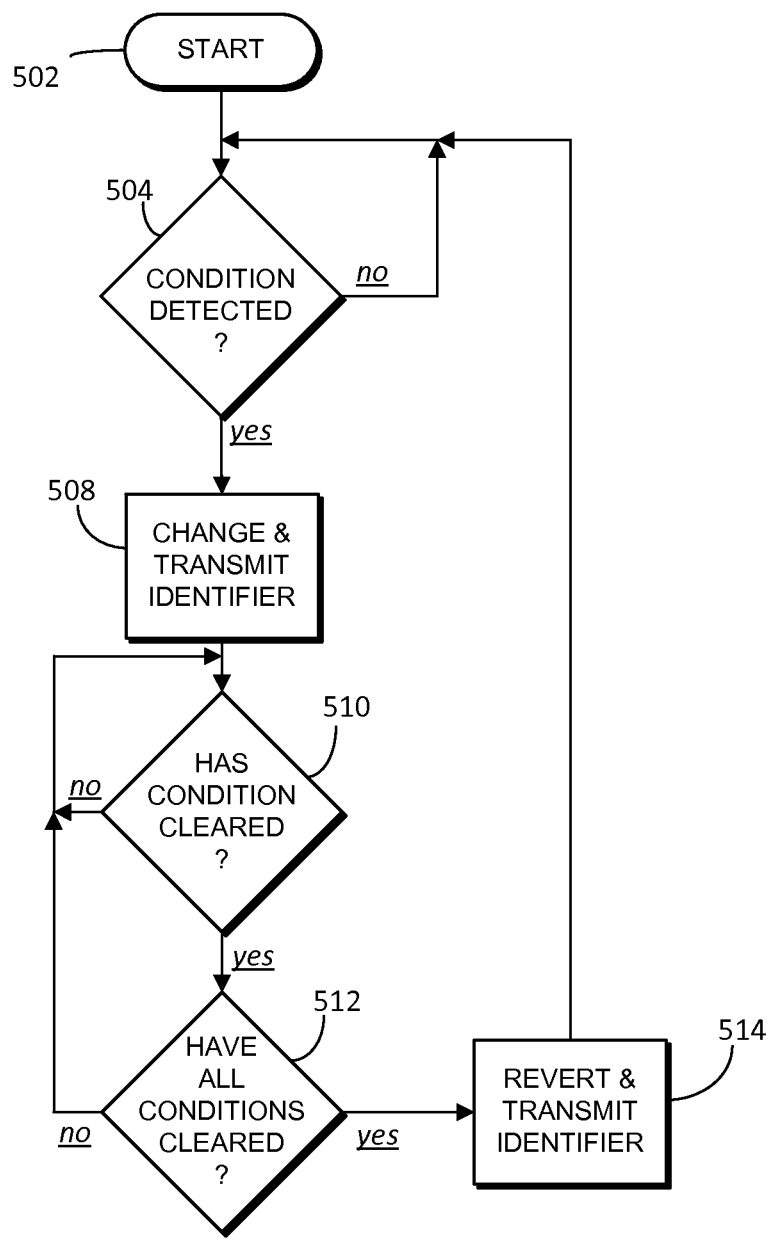
FIG. 5 shows a flow chart diagram of a method for operating a WLAN access point in accordance with some embodiments.

FIG. 5 shows a flow chart diagram of a method 500 for operating a device that includes WLAN access point functionality in accordance with some embodiments. At the start 502, the WLAN access point is operating, and broadcasting or otherwise transmitting an identifier, although it is not necessarily connected to a wide area data network and may, in some embodiments, function merely as a WLAN router. In the present example it is assumed that a device designed to invoke interference mitigation operating on a first WWAN air interface, such as a portable public safety LTE device, is able to receive transmissions from the WLAN access point. However, the WLAN access point can carry out the method regardless of the presence or absence of such devices in the vicinity of the WLAN access point. In some embodiments the WLAN access point identifier can be broadcast to allow all WLAN receivers to receive the identifier, such as is typically performed with an SSID. In some embodiments the identifier can be transmitted to WLAN receivers in particular transmissions, such as in responses to association requests, responses to polling frames, or other transmissions that are specific to a particular client device. The identifier that is initially transmitted, when received by, for example, a portable public safety LTE-enabled radio device with interference mitigation functionality, may not cause the receiving device to invoke the interference mitigation. The WLAN access point then commences determining if a condition has occurred that indicates a device may be present in the vicinity of the WLAN access point that uses a second WWAN air interface, and therefore interference mitigation by devices using the first WWAN air interface may be beneficial, as in process 504. The condition can be, for example, the activation of a mobile public safety radio communication device that is co-located with the access point, or the determination by the WLAN access point that a portable PSNB device is in close proximity to the access point. In general, the condition in process 504 indicates that there can be an interference issue between the portable LTE device and another device using a different WWAN air interface.

In embodiments where the WLAN access point determines that a portable PSNB device is in close proximity to the WLAN access point, the access point checks to see if the device is one for which other devices using a different WWAN air interface must invoke interference mitigation. As each device associates with the WLAN access point, it can receive credentials from the associating device, such as a MAC address and/or other identifying information that can be used, for example in process 504, to determine if the device is a PSNB device. The WLAN access point can contain a list of identifiers of such devices, or the WLAN access point can query a networked database located remotely from the WLAN access point to determine if the associating device is a PSNB (or other device that necessitates other devices invoking interference mitigation), or the PSNB device can transmit information indicating it is a PSNB device, such as in an association request, in response to determining that the WLAN access point is supports devices using a different WWAN air interface, such as if the WLAN access point is a VSM for public safety vehicles.

Once a condition occurs that triggers an identifier change, the method 500 monitors the condition to determine if the condition has cleared, indicating the interference mitigation measure may no longer be necessary, as in process 510. If the condition has cleared, the access point can determine if any other conditions have occurred that require the interference mitigation measure, and the access point can check if those have cleared as well (e.g. "yes" out of process 512). If there are no conditions remaining that require the interference mitigation measure (e.g., all conditions are cleared), the identifier can be changed back to its initial state as in process 514, and the WLAN access point is essentially at its initial state at the start 502. When the identifier is reverted to its initial state it can be conveyed to devices that have invoked interference mitigation in the same manner as in process 508.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Reference to any technical standards, either in the specification, the claims, or both, are meant to refer to those standards as they were described at the time of filing the present application.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
receiving, by a wireless local area network (WLAN) transceiver of a portable communication device, in a signal transmitted by a WLAN access point, an identifier that identifies the WLAN access point;
determining, by the portable communication device, that the identifier is indicative of a potential interference condition with respect to a wireless wide area network (WWAN) device separate from the portable communication device and the WLAN access point, and as a result, that an interference mitigation measure is to be invoked in operating a WWAN transceiver of the portable communication device to mitigate interference with respect to the WWAN device; and
in response to determining that the interference mitigation measure is to be invoked, configuring the WWAN transceiver to avoid using at least one frequency band of a WWAN air interface while accessing a WWAN over the WWAN air interface.

2. The method of claim 1, wherein determining that the interference mitigation measure is to be invoked comprises determining that the identifier is a service set identifier (SSID) having a name and an extension, wherein the presence of the extension in the SSID indicates the interference mitigation measure is to be taken.

3. The method of claim 1, wherein determining that the interference mitigation measure is to be invoked comprises determining that the identifier is included in a list of WLAN access point identifiers that require the portable communication device to take the interference mitigation measure.

4. The method of claim 3, wherein determining that the identifier is included in the list of WLAN access point identifiers comprises determining that the identifier is included in the list of WLAN access point identifiers stored in the portable communication device.

5. The method of claim 1, wherein determining that the interference mitigation measure is to be invoked further comprises:
 measuring a strength of the signal broadcast by the WLAN access point to obtain a radio signal strength indicator (RSSI);
 comparing the RSSI to a preselected threshold; and
 determining that the RSSI exceeds the preselected threshold.

6. The method of claim 1, wherein configuring the WWAN transceiver to avoid using at least one frequency band of said WWAN air interface comprises configuring the WWAN transceiver to avoid using at least one frequency band pair including an uplink frequency band and a downlink frequency band that are offset in frequency from each other.

7. The method of claim 1, wherein configuring the WWAN transceiver to avoid using at least one frequency band of said WWAN air interface comprises configuring the WWAN transceiver to avoid using at least one frequency band of a Long Term Evolution (LTE) air interface.

8. The method of claim 1, subsequent to configuring the WWAN transceiver to avoid using at least one frequency band of said WWAN air interface while accessing the WWAN over the WWAN air interface, the method further comprises:
 receiving a second identifier that identifies the WLAN access point, the second identifier different from the first identifier;
 determining, by the portable communication device, that the second identifier is one indicative that the potential interference condition no longer exists; and
 reconfiguring the WWAN transceiver to be operable on the at least one frequency band while accessing the WWAN over the WWAN air interface.

9. An apparatus, comprising:
 a wireless local area network (WLAN) transceiver;
 a wireless wide area network (WWAN) transceiver;
 a controller that operates the WLAN and WWAN transceivers and receives from the WLAN transceiver an identifier, in a signal transmitted by a WLAN access point and received by the WLAN transceiver, that identifies the WLAN access point, the controller is further configured to determine that the identifier is indicative of a potential interference condition with respect to a WWAN device separate from the apparatus and the WLAN access point, and as a result, that an interference mitigation measure is to be invoked in operating the WWAN transceiver to mitigate interference with respect to the WWAN device and in response configures the WWAN transceiver to avoid using at least one frequency band of a WWAN air interface while accessing the WWAN over the WWAN air interface.

10. The apparatus of claim 9, wherein the identifier is a service set identifier (SSID) having a name and an extension, the controller determines that the interference mitigation measure is to be invoked based on the extension in the SSID.

11. The apparatus of claim 9, wherein the controller determines that the identifier is included in a list of WLAN access point identifiers that require the interference mitigation measure.

12. The apparatus of claim 11, wherein the list of WLAN access point identifiers is stored in the apparatus.

13. The apparatus of claim 9, wherein the controller further determines that the interference mitigation measure is to be invoked when a radio signal strength indicator (RSSI) of the signal broadcast by the WLAN access point exceeds a preselected threshold.

14. The apparatus of claim 9, wherein the controller configures the WWAN transceiver to avoid using at least one frequency band pair including an uplink frequency band and a downlink frequency band that are offset in frequency from each other.

15. The apparatus of claim 9, wherein the at least one frequency band comprises at least one frequency band of a Long Term Evolution (LTE) air interface while accessing the WWAN over the LTE air interface.

16. The apparatus of claim 9, wherein the controller, after the controller configures the WWAN transceiver to avoid using at least one frequency band of said WWAN air interface while accessing the WWAN over the WWAN air interface, the controller receives a second identifier that identifies the WLAN access point, the second identifier different from the first identifier, and determines that the second identifier is one indicative that the potential interference condition no longer exists and, in response, reconfigures the WWAN transceiver to be operable to use the at least one frequency bands of the WWAN air interface when accessing the WWAN.

17. A method of operating a wireless local area network (WLAN) access point device to mitigate interference among devices operating on different wireless wide area networks (WWAN) that use nearby frequencies, comprising:
 transmitting, by the WLAN access point device, an identifier of the WLAN access point device;
 determining, by the WLAN access point device, that a condition has occurred that necessitates an interference mitigation measure be taken by devices operating on a first WWAN to mitigate out of band interference between the devices operating on the first WWAN and devices operating on a second WWAN; and
 responsive to determining that the condition has occurred, the WLAN access point device modifying the identifier transmitted by the WLAN access point device to indicate to the devices operating on the first WWAN to commence an interference mitigation process.

18. The method of claim 17, wherein the identifier is a service set identifier (SSID) having a name and an extension, modifying the identifier comprises one of either adding or changing the extension.

19. The method of claim 17, further comprising:
 subsequent to modifying the identifier, determining that the condition has cleared; and
 reverting the identifier to an initial state.

20. The method of claim 17, wherein the WLAN access point device comprises a WWAN transceiver that operates on the first WWAN, the method further comprises, in response to determining that the condition has occurred, configuring the WWAN transceiver of the WLAN access point device to avoid using at least one frequency band of a first WWAN air interface of the first WWAN while accessing the first WWAN over the first WWAN air interface.

* * * * *